United States Patent Office 3,749,606
Patented July 31, 1973

3,749,606
REVERSIBLE CELL HAVING A SOLID ELECTROLYTE AND A SILVER ANODE
Mario De Rossi, Rome, Italy, assignor to Consiglio Nazionale delle Ricerche, Rome, Italy
Filed Oct. 6, 1971, Ser. No. 187,066
Int. Cl. H01m 11/00
U.S. Cl. 136—83 R            13 Claims

ABSTRACT OF THE DISCLOSURE

A reversible solid state electric cell having a silver anode and a solid electrolyte composed of a mixture of silver iodide and a polyamine iodide is disclosed. Batteries comprising an assembly of the cells and a method for preparing same is also disclosed. The solid electrolyte overcomes the disadvantages of prior known solid state cells and provides a battery having a higher conductivity than previously possible. The positive electrode (cathode) of the cell is made of a mixture of a powdered conductive material, such as graphite, a polyamine iodide and molecular iodine.

BACKGROUND OF THE INVENTION

Field of the invention

The present invention relates to solid state electric cells and more particularly to an improved reversible cell having a novel solid electrolyte and batteries comprising an assembly of such cells.

Description of the prior art

As is well known in the art, solid state cells possess certain distinct advantages over both aqueous electrolytic cells and dry cells. These advantages include, e.g., a potential of easy miniaturization, operational capabilities at high and low temperatures and a relatively long storage life.

Until recently however, known solid state cells have been limited to microwatt power applications because of their high internal resistance. Stated differently, known solid state cells suffer from the disadvantage that lay in the low conductivity of solid electrolytes, the latter causing a high internal resistance thereby limiting the discharge current densities to a few microamperes per square centimeter of the electrolytic surface.

More recently, a new class of solid electrolytes of the type $MAg_4I_5$, wherein M may be Rb, K, $NH_4$ or Cs, has been discovered. The conductivity of the $MAg_4I_5$ compounds, due to the movement of the $Ag^+$ ions alone, is high and is comparable with that of the aqueous electrolytes used in conventional storage batteries. This discovery has made it possible to construct solid state cells having high discharge current densities, that is, discharge densities on the order of a few milliamperes per square centimeter.

Solid state cells having $MAg_4I_5$ as the solid electrolyte have been found, however, to present certain difficulties. Thus it has been almost impossible to minimize the contact resistance between the electrodes and the electrolyte. This difficulty results in cells with an internal resistance value much higher than that which one would have expected on the basis of the conductivity value of the electrolyte.

Another difficulty previously connected or encountered with $MAg_4I_5$ solid electrolyte cells is the difficulty in obtaining a solid element or compound, such as $RbAg_4I_5$ free of impurities. It has been discovered that impurities, even in traces, greatly reduces the $Ag^+$ mobility in the $RbAg_4I_5$ lattice and consequently the $RbAg_4I_5$ ionic captivity.

Finally, and in addition to the relatively high cost of materials, such as rubidium, in known $RbAg_4I_5$ solid electrolyte cells, it has proved impossible to obtain cell reversibility due to the way in which the cathode gives up the $I^-$ ions to the electrolyte.

To overcome the above discussed disadvantages, solid state cell of the type $$Ag/RbAg_4I_5/I_2, TBAI, C$$

have been proposed in Switzerland patent application 3,591/70.

In the cells disclosed in this patent application, the electrolyte is free of all impurities, even in traces, and the cathode is made of a mixture of molecular iodine and a conductive material, such as powdered graphite, the latter not participating in the electrochemical process. These cells also contain, in the cathodic mixture, tetrabutylammonium iodide (TBAI) as a cathodic depolarizer.

It has further been disclosed in U.S. Pat. 3,476,606 to use a solid electrolyte comprising monoamine iodides and AgI. The solid electrolyte element disclosed in this patent has the general formula $$QAg_6I_7$$

wherein Q is an organic ammonium cation $N(CH_3)_4^+$ or more generally $NR_4^+$. It has been found that while the use of the electrolyte disclosed in U.S. 3,476,606 eliminates the drawback of high material costs, the values of the conductivity curves for such cells are lower than cells employing $MAg_4I_5$ as the electrolyte.

SUMMARY OF THE INVENTION

In summary, the present invention is directed to a novel solid state electric cell that is less expensive to make than those containing materials such as rubidium and is not attendant to the disadvantages thereto. Further, the cells of the invention have a higher conductivity than cells containing monoamine iodides. Stated broadly, in accordance with the present invention there is provided a reversible cell wherein the solid electrolyte is composed of a mixture of silver iodide and polyamine iodides and a cathode comprising a mixture of molecular iodine, powdered graphite and, as a cathodic depolarizer, a polyamine iodide. Means are also provided as will be discussed hereinbelow, for reducing the anodic contact resistance.

It is accordingly a general object of the present invention to provide a solid state electric cell that is not subject to, and overcomes a disadvantage of, previously known solid state electric cells.

A further and more particular object of the invention is to provide an improved solid state electrochemical device that is relatively inexpensive to manufacture and which has a solid electrolyte of higher ionic conductivity than heretofore available.

A further object is to provide an improved method for preparing the solid state electric cell of the invention as well as batteries comprising an assembly of such cells.

BRIEF DESCRIPTION OF THE DRAWINGS

The manner in which the foregoing and other objects are achieved in accordance with the present invention will be better understood in view of the following detailed description and accompanying drawings which form a part of the specification and wherein.

DESCRIPTION OF THE PREFERRED EMBODIMENT(S)

Figure 1:
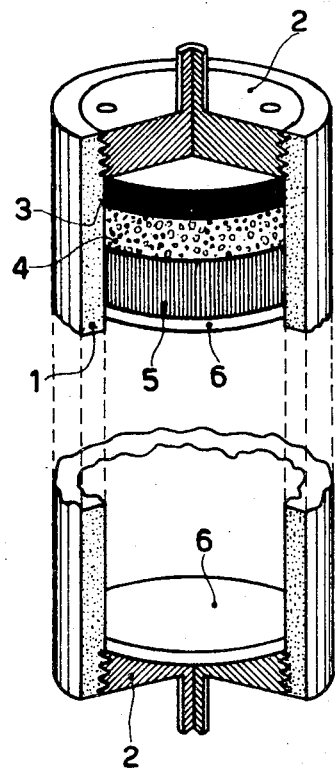
FIG. 1 is a perspective, partially cut away view, illustrating an assembly of the solid state electric cells of the present invention.

As generally discussed above, the unique reversible cell of the present invention comprises a silver anode, a solid electrolyte composed of silver iodide and a polyamine iodide, and a cathode (i.e., the positive electrode) made of a mixture of molecular iodine, powdered graphite and a polyamine iodide cathodic depolarizer.

In accordance with the invention, the solid electrolyte is obtained in substantially pure form by the fusion and subsequent quench under vacuum of a stoichiometric mixture of AgI and a polyamine iodide having the general formula $QI_n$ wherein Q is an $RN_n^{2+}$ cation ($n=2, 3, 4, 5 \ldots$). These compounds can also be written as:

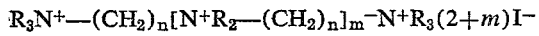

wherein R is methyl or ethyl, $m$ is 0 or 1, and $n$ is between 1 and 10. It has been found that the percentage of AgI for each electrolyte increases accordingly to the number of atoms of nitrogen. This is independent of the size of the cation and the type of radical introduced.

In the case of compounds of the $QI_2$ type (wherein Q is an organic ammonium cation of the $R_3N^+$—R—$N^+R_3$ type) maximum conductivity values are obtained when the molar ratio of $QI_2$ to AgI is 1:12. Thus the cell would be of the type $$Ag/QAg_{12}I_{14}/I_2, QI_2, C$$

While the present invention is not limited to the use of a specific polyamine iodide (such compounds being known as disclosed e.g., in 3,057,760) it has been unexpectedly discovered that the following polyamine halides are particularly advantageous. These are:

$R_3N^+$—R—$N^+$—$R_32I^-$: e.g., hexa - 1,6 - bi-trimethylammonium iodide, also referred to as hexamethonium iodide ($XI_2$)

$R_3N^+$—R—$N^+R_2$—R—$N^+R_33I^-$: e.g., octamethyldiethylentriammonium iodide which is a triamine iodide ($TrI_3$)

Other polyamine halides that may be advantageously employed are methane-1,1-bis-methyldiethylammonium iodide
ethane-1,2-bis-trimethylammonium iodide
propane-1,3-bis-trimethylammonium iodide
butane-1,4-bis-trimethylammonium iodide
pentane-1,5-bis-trimethylammonium iodide
nonane-1,9-bis-trimethylammonium iodide
decane-1,10-bis-trimethylammonium iodide As briefly indicated above, maximum conductivity values, when employing the above noted polyamine halides, are obtained when the molar ratio of $QI_2$ to AgI is 1:12. In the case of the triamine iodide, i.e., octamethyldiethylenetriammonium iodide, the molar ratio is preferably 1:22. At this ratio conductivity values (specific conductivity expressed in ohm$\times$cm.$^{-1}$) on the order of 0.058 are obtained.

Conductivity values for the above polymethonium iodides, e.g., hexa-1,6-bi-trimethylammonium iodide range from about 0.011 to 0.045 (ohm$\times$cm.$^{-1}$).

As briefly noted above, the unique cell of the present invention includes a silver anode which may be of amalgamated silver Ag(Hg) or may be formed, as described hereinafter, by depositing the silver electrolytically, i.e., by electrolysis.

The cathode comprises a mixture of molecular iodine, powdered graphite and a polyamine iodide, such as the above noted hexamethonium iodide. While the ranges or proportions of the individual constituents of the cathodic mixture may vary widely, it has been found that preferably the proportions are in the range of $C:QI_n:I_2=1:1:1$ to 1:1:5. If the polyamine halide is hexamethonium iodide, preferred proportions are 1:1:2.

The electrochemical process of the cell may be expressed as

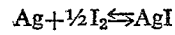

In accordance with the present invention the cathodic contact resistance is minimized by the fact that polyamine halides retain iodine in molecular form. Also this manner of retaining the iodine makes the cell reversible and rechargeable with a coulombic efficiency close to unity. During the cell discharge, iodine is liberated by the polyamine iodide in such a way that it can participate in the electrochemical process.

The use of the above discussed cathodic mixture not only minimizes the contact resistance, but also provides a cell with an almost infinite storage life. This is possible because free iodine, which may corrode the electrolyte, is not present when the cell is not operative.

Furthermore, when hexamethonium iodide is used, the molecular ratio between the hexamethonium iodide and the iodine in the addition compound is double that obtained by using tetramethylammonium iodide and its derivatives.

In accordance with the invention the anodic contact resistance may be minimized by using an amalgam of silver which gives an effective adherence between the electrode and the electrolyte surfaces.

In this case, the electrochemical process is

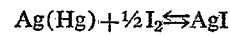

The E.M.F. of this cell is 0.57 v. at a temperature of 25° C. It has been found, however, that the use of an anode made of amalgamated silver reduces the cell's E.M.F. by about 100 mv., from the theoretical value. This is due to the formation of silver iodide which was not taken into account when forming the theoretical value. In order to avoid the formation of silver iodide and also to further minimize the anodic contact resistance, it has been discovered that it is particularly advantageous to use an electrode of silver that has been deposited by electrolysis on the surface of the electrolyte.

Figure 3:
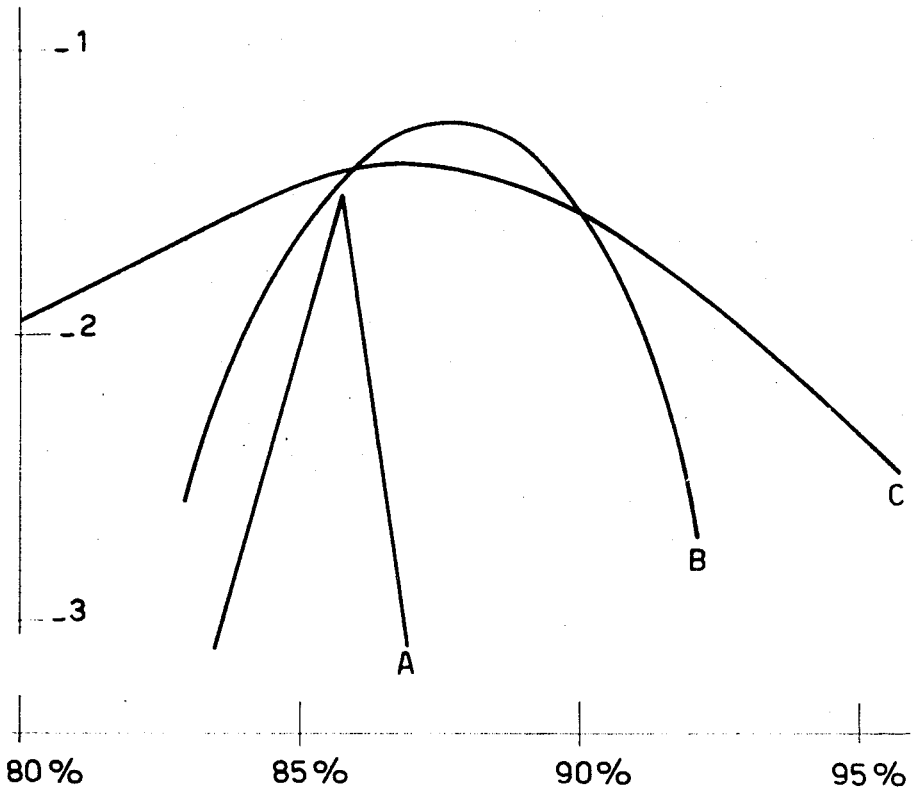
FIG. 3 is a graph the curves of which show conductivity values plotted against the molar percentage of Ag, curves A and B illustrating cell embodiments of the invention, curve C illustrating the prior art.

Turning now to the drawings and with reference first to FIG. 1, batteries comprising an assembly of cells of the present invention may be constructed by sandwiching, inside an insulating container 1, an amalgamated silver sheet 6, a solid electrolyte 5 and a cathodic layer 4, a sheet 3 of conductive material, such as graphite, and then another silver sheet 6 and so on until the desired voltage is obtained. The contact between the components is obtained by external compression, as for example by means of threaded ferrules 2 screwed into the insulating container. A sheet 3 of conducting material (that does not take place in the electromotive process) may also be positioned immediately below the ferrule 2 as shown in FIG. 3.

If mercury is used as an anodic depolarizer, one side of each silver sheet is amalgamated and this amalgamated side is placed in contact with the neighboring solid electrolyte. If the deposit of silver by electrolysis is used as a means for diminishing the anodic contact resistance the electrolyte, before being placed in the cell, is compressed between two silver electrodes. A difference of potential is created between the electrodes so that a current flows between them due to the movement of the $Ag^+$ ions, which brings about a loss of silver at the positively polarized electrode and a deposit of silver on the negatively polarized electrode. The negative electrode is enriched with Ag which adheres to the electrolyte. Once the requisite quantity of Ag has been deposited, the positive auxiliary Ag electrode is removed and replaced by a layer of cathodic mixture containing the free iodine, graphite and polyamine iodide.

The pure sheets of the solid electrolyte are obtained by the fusion and a subsequent quench of the melt under vacuum conditions of the stoichiometrical mixture of the polyamine iodide and silver. Sheets of the solid electrolyte are obtained by submitting the fused mass to pressures on the order of about 1000 kg./cm.²

The cathodic mixture is formed by heating a mixture of the constituents and uniformly spreading (as by spraying) the heated mass on the electrolytic surface and causing said mass to solidify thereon. This insures an effective adherence between the cathodic mass and the electrolyte.

To summarize the above, the battery in accordance with the present invention comprises within an insulating case 1 and a first electrical contact 2 in the form of a cap or ferrule;
a sheet 3 of conductive material that does not take place in the electromotive process;
a layer of cathodic mixture 4 comprising powdered graphite, a polyamine iodide and molecular iodine;
a sheet of solid electrolyte 5 made of the polyamine iodide and silver iodide;
a layer of silver 6 either electrolytically deposited on the sheet 5 or amalgamated on the side facing the electrolyte 5;
other cells constructed in the same manner until the required E.M.F. is obtained; and
a second electrical contact 2.

The electrical contacts which are positioned at either end of the insulated case are screwed into the case so that they exert a pressure on the sheets within the case and maintain them firmly compressed against one another.

Figure 2:
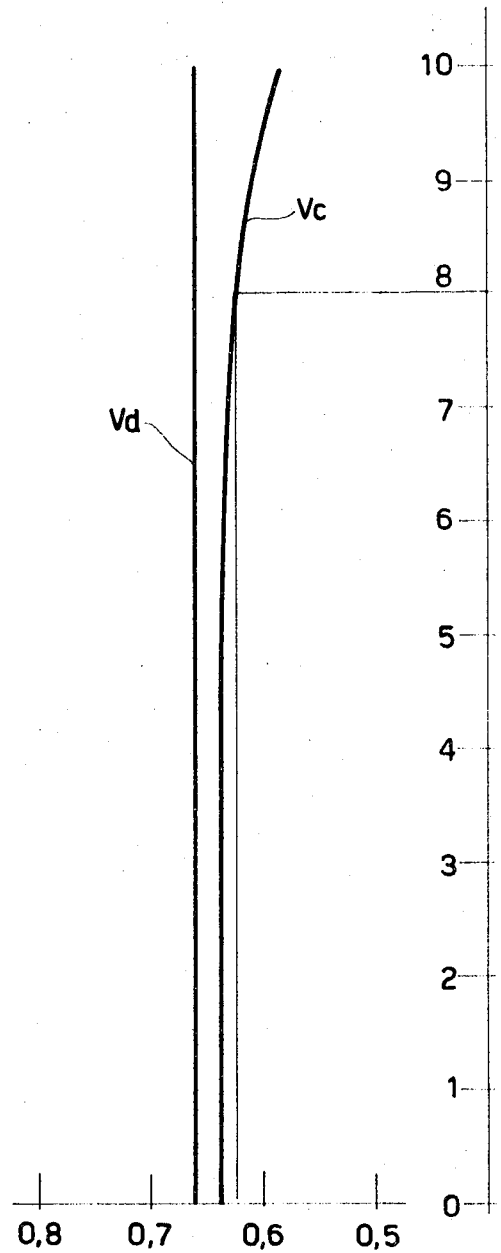
FIG. 2 is a graph illustrating the charge and discharge characteristics of a particularly advantageous solid state cell embodiment of the invention.

In FIG. 2 there is shown a graph representing or illustrating the variation in time, expressed in hours ($y$-axis) and the tension, expressed in volts ($x$-axis) for a complete charge-discharge cycle with a constant current intensity of 0.1 ma. at a temperature of 25° C. for a cell of the following type

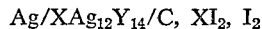

FIG. 3 represents the variation in the specific conductivity expressed in log ohm.$^{-1}$ cm.$^{-1}$ ($y$-axis) as a function of the percentage of Ag ($x$-axis) for the following:

Curve A—hexa-1,6-bi-trimethylammonium iodide-AgI
Curve B—octamethyldiethylentriammonium iodide-AgI
Curve C represents the prior art, i.e., the use of monoamine iodide (specifically tetra-methylammonium iodide-AgIas disclosed in U.S. Pat. 3,476,606.

As should be readily apparent to those skilled in the art, the present invention provides a truly unique solid state cell of higher conductivity than known cells and a unique method for preparing same. While particularly advantageous embodiments have been shown for illustrative purposes, it should be expressly understood that the invention is not limited thereto.

What is claimed is:

1. A solid state reversible electric cell comprising a silver anode; a solid electrolyte composed of silver iodide and a polyamine iodide substantially free from impurities, said polyamine iodide having the formula

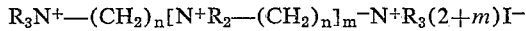

wherein R is selected from the group consisting of methyl and ethyl, $m$ is a number between 0 and 1, and $n$ is a number between 1 and 10; a cathode consisting of a mixture of molecular iodine, a powdered conductive material and a polyamine iodide, said polyamine iodide having the formula

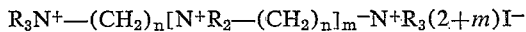

wherein R is selected from the group consisting of methyl and ethyl, $m$ is a number between 0 and 1, and $n$ is a number between 1 and 10, said cell further comprising means to reduce the anodic contact resistance.

2. The reversible solid state electric cell according to claim 1 wherein the polyamine iodide is hexa-1,6-bi-trimethylammonium iodide.

3. The reversible solid state cell according to claim 1 wherein said polyamine iodide is octamethyldiethylentriammonium iodide.

4. The reversible solid state electric cell according to claim 1 wherein the ratio of the components of the cathodic mixture comprising said carbon, polyamine iodide and molecular iodine is about 1:1:2 respectively.

5. The reversible solid state electric cell according to claim 1 wherein said anode comprises a mercury amalgam to reduce the anodic contact resistance.

6. The reversible solid state electric cell in accordance with claim 1 wherein said anode comprises a layer of silver deposited by electrolysis on the surface of the electrolyte.

7. The reversible solid state electric cell according to claim 1 wherein said solid electrolyte is prepared by the vacuum fusion of a stoichiometrical mixture of a polyamine iodide and AgI.

8. A battery comprising a plurality of cells in series which are maintained in intimate contact with each other by compression means at the end of said battery, each of said cells comprising a silver anode; a solid electrolyte composed of silver iodide and a polyamine iodide substantially free from impurities, said polyamine iodide having the formula

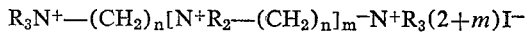

wherein R is selected from the group consisting of methyl and ethyl, $m$ is a number between 0 and 1, and $n$ is a number between 1 and 10; a cathode consisting of a mixture of molecular iodine, a powdered conductive material and a polyamine iodide, said polyamine iodide having the formula

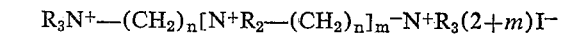

wherein R is selected from the group consisting of methyl and ethyl, $m$ is a number between 0 and 1, and $n$ is a number between 1 and 10, said cell further comprising means to reduce the anodic contact resistance.

9. A method for producing a solid state battery having low internal resistance, said method comprising the steps of providing an insulating container, sandwiching inside said insulating container a series of cells; each of said cells being formed by depositing a sheet of silver on one side of a solid electrolyte, said solid electrolyte comprising a fused mass of silver iodide and a polyamine iodide, said polyamine iodide having the formula

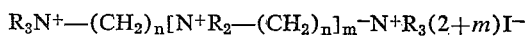

wherein R is selected from the group consisting of methyl and ethyl, $m$ is a number between 0 and 1, and $n$ is a number between 1 and 10; and depositing on the opposite side of said electrolyte a cathodic mixture comprising graphite, a polyamine iodide having the formula

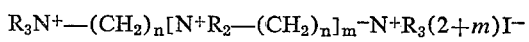

wherein R is selected from the group consisting of methyl and ethyl, $m$ is a number between 0 and 1, and $n$ is a number between 1 and 10, and molecular iodine and maintaining said cells in contact with each other by means of external depression.

10. A method in accordance with claim 9 wherein the solid electrolyte is compressed into sheets to improve its conductivity at a pressure on the order of about 1,000 kg./cm.².

11. A method according to claim 9 wherein the cathodic mixture is formed by intimately mixing powdered graphite, a polyamine iodide and molecular iodide; heating said mixture; spraying said mixture onto the solid electrolyte and allowing said cathodic mixture to solidify thereon.

12. A method according to claim 9 wherein the sheet of silver is amalgamated on the side which enters into contact with the solid electrolyte.

13. The method according to claim 9 and further comprising placing said solid electrolyte, prior to its introduction into said cell between two silver electrodes, establishing a difference of potential between said electrodes so that a current flows between them due to the movement of the silver ions through the electrolyte, depositing silver on the negatively polarized electrode until the required deposit of silver is obtained and removing the positive silver electrode and replacing same with a cathodic mixture comprising molecular iodine, a polyamine iodide and graphite.

References Cited
UNITED STATES PATENTS

| | | | |
|---|---|---|---|
| 3,653,968 | 4/1972 | Louzos | 136—83 R |
| 3,476,606 | 11/1969 | Owens | 136—83 R |
| 3,663,299 | 5/1972 | Owens et al. | 136—83 R |
| 3,660,164 | 5/1972 | Hermann et al. | 136—137 |
| 3,598,654 | 8/1971 | Hruden | 136—83 R |
| 3,443,997 | 5/1969 | Argue et al. | 136—83 R |
| 3,352,720 | 11/1967 | Wilson et al. | 136—137 |
| 3,674,562 | 7/1972 | Schneider et al. | 136—137 |
| 3,660,163 | 5/1972 | Moser | 136—137 |

ALLEN B. CURTIS, Primary Examiner

C. F. LE FEVOUR, Assistant Examiner

U.S. Cl. X.R.

136—153

PO-1050
(5/69)

UNITED STATES PATENT OFFICE
CERTIFICATE OF CORRECTION

Patent No. 3,749,606    Dated July 31, 1973

Inventor(s) MARIO DE ROSSI

It is certified that error appears in the above-identified patent and that said Letters Patent are hereby corrected as shown below:

The patent fails to disclose that the patentee is entitled to the benefit of the foreign filing date of Swiss patent application 8698/71, filed June 15, 1971, Signed and sealed this 25th day of December 1973.

(SEAL)
Attest:

EDWARD M. FLETCHER, JR.
Attesting Officer

RENE D. TEGTMEYER
Acting Commissioner of Patents